United States Patent
Othmer

(10) Patent No.: US 7,363,029 B2
(45) Date of Patent: Apr. 22, 2008

(54) UNIFIED INTERFACE FOR VOICE, TEXT OR PICTURE MESSAGE AUTHORING

(75) Inventor: Konstantin Othmer, Mountain View, CA (US)

(73) Assignee: Core Mobility, Inc., Mountain View, CA (US)

( * ) Notice: Subject to any disclaimer, the term of this patent is extended or adjusted under 35 U.S.C. 154(b) by 454 days.

(21) Appl. No.: 11/129,126

(22) Filed: May 13, 2005

(65) Prior Publication Data

US 2006/0189333 A1    Aug. 24, 2006

Related U.S. Application Data

(63) Continuation-in-part of application No. 11/007,700, filed on Dec. 8, 2004, which is a continuation-in-part of application No. 10/661,033, filed on Sep. 12, 2003, now Pat. No. 7,183,687.

(51) Int. Cl.
*H04L 29/08* (2006.01)
*H04Q 7/22* (2006.01)
*H04Q 7/38* (2006.01)

(52) U.S. Cl. .............. 455/414.4; 455/414.1; 455/414.3; 455/412.1; 455/418; 455/466; 455/563; 455/550.1; 455/552.1; 455/90.1; 455/67.11; 455/67.7; 455/68; 455/566; 455/575.1; 379/88.01; 379/88.04; 379/88.12; 379/88.13; 379/88.22; 379/88.23; 704/275; 340/7.51; 340/7.52

(58) Field of Classification Search ......... 455/412.1–2, 455/413, 466, 418–420, 414.1–4, 550.1, 455/557, 556.1–2, 563–567, 569.1–2, 90.1–3, 455/575.1, 966.1, 116, 67.11, 7, 115–1.4, 455/127.4, 91, 93, 68–69, 552.1, 344–345; 379/38–42, 51, 68, 78–82, 88.01–4, 88.08–9, 379/88.12–14, 88.22–28, 93.09, 11, 100.15–16; 340/7.51–62; 704/201, 246, 275–277, 231, 704/251
See application file for complete search history.

(56) References Cited

U.S. PATENT DOCUMENTS 4,856,066 A    8/1989    Lemelson (Continued)

FOREIGN PATENT DOCUMENTS

EP    1113631 A2    7/2001

OTHER PUBLICATIONS

U.S. Appl. No. 11/007,700, filed Dec. 8, 2004, El-Fishawy et al.

*Primary Examiner*—Tuan A. Tran
(74) *Attorney, Agent, or Firm*—Workman Nydegger

(57) ABSTRACT

A unified messaging interface and associated methods that enables mobile communication device users to initiate the creation of a message for a recipient without being required to explicitly specify the type of message that is to be created. The mobile communication device supports multiple message types, such as voice, text, and picture messages. The user begins providing message content to the communication device by, for example, speaking, entering text, or clicking a shutter of a camera. The unified messaging interface detects the nature of the content and creates a corresponding type of message. The user can indicate a desire to create and send a message by performing "one-click" action. The one-click action is an operation performed on the device that can be instantiated as a single button-press on the keypad; selection of a single soft key by depressing a button on the keypad or touching the screen of the device; or issuance of a single voice command.

20 Claims, 4 Drawing Sheets

U.S. PATENT DOCUMENTS

| | | |
|---|---|---|
| 5,146,487 A | 9/1992 | Bergsman et al. |
| 5,313,515 A | 5/1994 | Allen et al. |
| 5,483,580 A | 1/1996 | Brandman et al. |
| 5,646,982 A | 7/1997 | Hogan et al. |
| 5,675,507 A | 10/1997 | Bobo, II |
| 5,697,060 A | 12/1997 | Akahane |
| 5,751,791 A | 5/1998 | Chen et al. |
| 5,781,614 A | 7/1998 | Brunson |
| 5,889,840 A | 3/1999 | Lang et al. |
| 5,905,774 A | 5/1999 | Tatchell |
| 5,951,638 A | 9/1999 | Hoss et al. |
| 5,974,449 A | 10/1999 | Chang et al. |
| 6,038,296 A | 3/2000 | Brunson et al. |
| 6,052,440 A | 4/2000 | Yuhn |
| 6,075,844 A | 6/2000 | Goldberg et al. |
| 6,097,941 A | 8/2000 | Helferich |
| 6,144,644 A | 11/2000 | Bajzath et al. |
| 6,198,808 B1 | 3/2001 | Martin |
| 6,233,318 B1 | 5/2001 | Picard et al. |
| 6,282,270 B1 | 8/2001 | Porter |
| 6,304,752 B1 * | 10/2001 | Rignell ................... 455/403 |
| 6,418,307 B1 | 7/2002 | Amin |
| 6,438,217 B1 | 8/2002 | Huna |
| 6,463,131 B1 | 10/2002 | French-St. George et al. |
| 6,630,883 B1 | 10/2003 | Amin et al. |
| 6,636,733 B1 * | 10/2003 | Helferich ................. 455/412.2 |
| 6,654,448 B1 * | 11/2003 | Agraharam et al. ..... 378/88.14 |
| 6,731,926 B1 | 5/2004 | Link et al. |
| 6,785,363 B2 | 8/2004 | Culliss |
| 6,799,033 B2 | 9/2004 | Kanefsky |
| 6,826,264 B2 | 11/2004 | Valco et al. |
| 6,865,259 B1 | 3/2005 | Shaffer et al. |
| 6,882,708 B1 | 4/2005 | Bedingfield et al. |
| 6,934,552 B2 * | 8/2005 | Holley et al. ............... 455/466 |
| 6,954,136 B2 * | 10/2005 | Sauer ....................... 340/7.46 |
| 7,013,155 B1 | 3/2006 | Ruf et al. |
| 7,042,990 B2 * | 5/2006 | Marsot ................... 379/88.23 |
| 7,133,687 B1 | 11/2006 | El-Fishawy et al. |
| 7,151,923 B2 * | 12/2006 | Boland et al. ........... 455/412.2 |
| 2002/0194388 A1 | 12/2002 | Boloker et al. |
| 2003/0028604 A1 | 2/2003 | Aktas et al. |
| 2003/0055655 A1 | 3/2003 | Suominen |
| 2004/0176139 A1 * | 9/2004 | Wang ........................ 455/563 |

* cited by examiner

UNIFIED INTERFACE FOR VOICE, TEXT OR PICTURE MESSAGE AUTHORING

CROSS-REFERENCE TO RELATED APPLICATION

This application is a continuation-in-part of U.S. patent application Ser. No. 11/007,700, filed Dec. 8, 2004, which is a continuation-in-part of U.S. patent application Ser. No. 10/661,033, filed Sep. 12, 2003 now U.S. Pat. No. 7,183,687. The foregoing patent applications are incorporated herein by reference.

BACKGROUND OF THE INVENTION

1. The Field of the Invention

The present invention relates to an application for authoring a voice or text message on a communications device. More specifically, the present invention relates to a unified authoring interface for a communication device that allows both audio and text input without the user explicitly selecting the mode of communication, such that delivery of the message can then be optimized.

2. The Relevant Technology

The popularity of all types of communication devices, such as mobile telephones and telephony-enabled personal digital assistants (PDAs) is undeniable. In addition to circuit-switched and packet-switched voice sessions, numerous messaging applications, such as Email, Short Message Service (SMS) messages, Multimedia Messaging Service (MMS) messages, and Instant Messaging (IM) are available today on a wide variety of mobile communication devices. Also, services that assist users with information and updates, such as stock quotes, news alerts and driving directions, or services that improve personal productivity or provide customer services, can all be accessed and engaged via mobile communication devices. Furthermore, applications and services that deliver media content or other types of entertainment and are accessible via mobile communication devices are increasingly popular.

While applications and services that can be accessed via a mobile device deliver significant value to users, enhanced messaging services and the large modality of different ways of communicating (picture messaging, voice messaging, text messaging) have made these devices more complicated, inhibiting their use. It is well known in the art of user interface design that each additional step required for a user to reach an objective diminishes the chance the user will complete the task.

Mobile phones started out as very simple devices from a usability standpoint. The user merely entered the number and pushed the TALK key—an experience familiar to almost everyone. With the advent of SMS Messaging, the user could leave a text message for another user with a mobile phone. This additional option of authoring and sending a text message is now well understood and widely adopted in the mobile phone industry. Over the past few years, additional services have been introduced to allow users to author audio messages or picture messages and exchange them with other users. These technologies are seeing broader adoption, but the interface for selecting between messaging technologies is now much more complicated, which restricts their use.

To allow the user to choose between these various options, the communications devices have become much more complicated. Instead of simply selecting a recipient and selecting "message" rather than "talk", the user must now select what kind of message is to be sent: a text, audio, or picture message. This is typically done from a menu, since devices do not have dedicated keys for these operations. This has increased the complexity of messaging from one key press to two or more, a 100% or more increase in complexity. In many situations, and for frequent users who desire "rapid-fire" communications, this extra key-press inhibits use.

These new technologies have introduced the richness of communicating through a wide variety of means at the expense of simplicity. What is needed is a user interface that retains access to the rich communications without the added complexity of additional keys or button clicks.

SUMMARY OF THE INVENTION

The present invention is directed to systems and methods for authoring a message on a communications device through a simplified interface that uses the actions of the user, rather than explicit user instruction, to author a message and determine the appropriate means for delivery of that message.

According to one aspect of the invention, the message sender chooses a recipient from a contacts list, and then selects a "Send Message" key. The device then presents an interface that allows the user to start recording to author an audio message, start typing to author a text message, or press the camera shutter button to author a picture message. If the user takes no action, an audio message is recorded. If the user types in text characters, a text message is authored, and if the user clicks the shutter, a picture message is created. The delivery of the resulting messages is performed as soon as the "SEND" key is pressed.

Thus, this aspect of the present invention permits users to easily create text messages, record and transmit instant voice messages, or take and send a picture all from the same user interface to any recipient with just "one-click" on a mobile device.

The "one-click" action to launch the unified user interface can be physically performed on the device, such as a single button-press on the keypad of the mobile device, selection of a single soft key by using a button on the keypad, or by touching the screen of the device, or it can take the form of an articulated command.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which:

FIG. 2 shows the selection of a recipient. FIG. 3 shows the unified authoring interface including voice and text. FIG. 4 shows the screen that is displayed when the user starts typing on the keyboard to enter text.

DETAILED DESCRIPTION OF EMBODIMENTS OF THE INVENTION

The present invention is directed to systems and methods to streamline the user interface on wireless communication devices for the purpose of authoring messages.

I. Operating Environments Within Wireless Communication Systems

Figure 1:
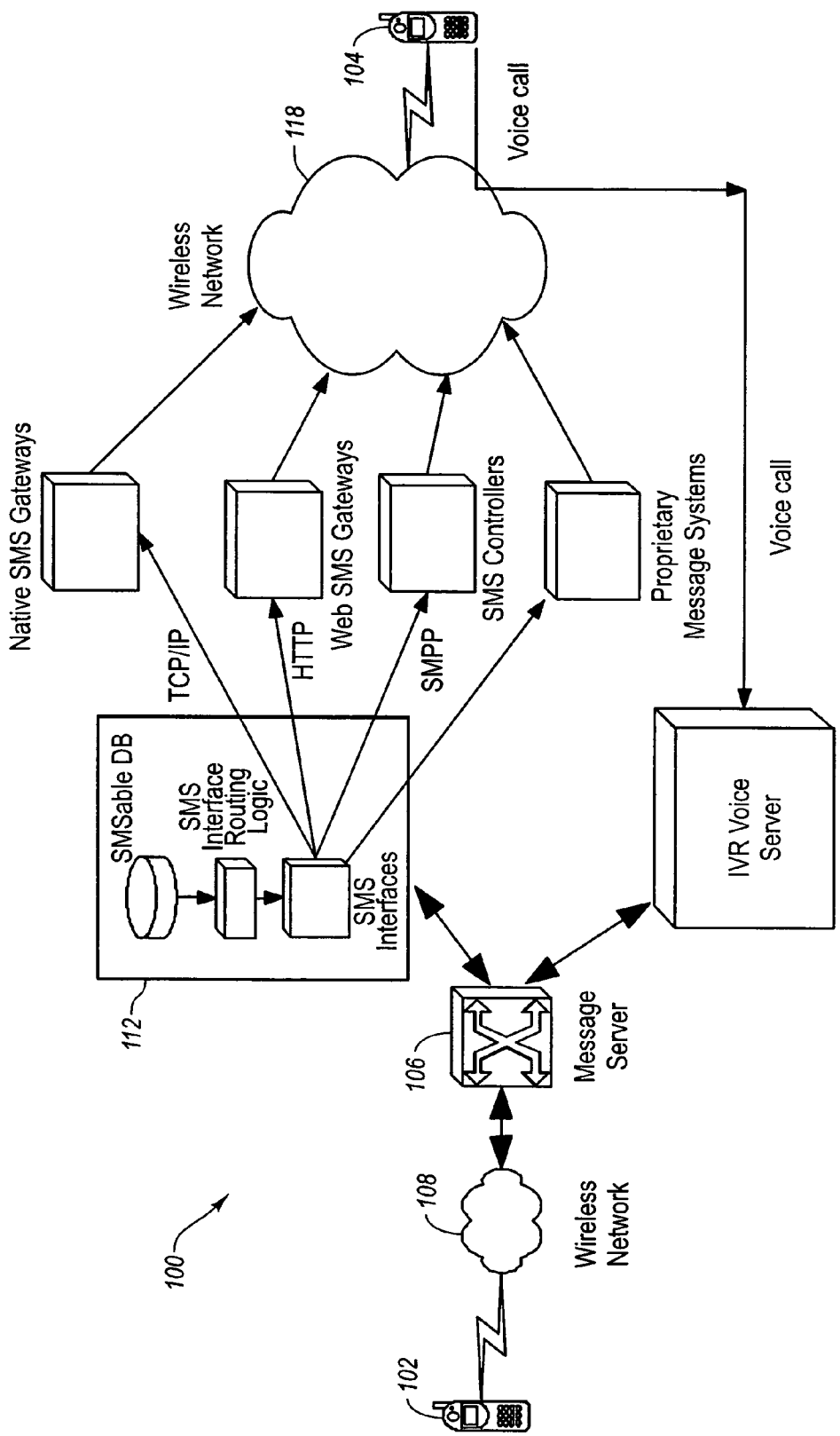
FIG. 1 is a block diagram illustrating a wireless network in which the voice messaging systems of the invention can be practiced.

FIG. 1 is a block diagram illustrating an example of a wireless communication system in which the invention can be practiced. Wireless communication system 100 includes a sender device 102 that is used to create and transmit a message that is addressed to a recipient wireless station 104. Sender device 102 can be a wireless or mobile telephone, a conventional wired telephone, or any other telephony device. In general, sender device 102 can be any device that is capable of receiving and capturing audio data that forms the body of the voice message and addressing information that identifies the recipient or the recipient wireless station 104 associated with the recipient. Instead of being a dedicated telephony device, sender device 102 can also be a personal computer or other computing devices having the foregoing capabilities.

In the embodiment of FIG. 1, sender device 102 communicates with a message server 106 using wireless network 108. In general, however, sender device 102 can communicate with message server 106 using any suitable communication network or mechanism, another example of which is the Public Switched Telephone Network (PSTN). Message server 106 is a computer system that routes the message and performs the other operations described herein. It should be understood that the invention can be implemented in many types of network environments and various network architectures are applicable. In one embodiment, the message server 106 and the associated SMS blade 112 reside in a wireless operator's network infrastructure. In another embodiment, the message server 106 and the SMS blade 112 reside outside the domain of a wireless operator's infrastructure, and may be hosted, for example, by an independent hosting entity, such as an application service provider. Alternately, the message server 106 and the associated SMS blade 112 can reside behind a corporate firewall.

Additional details of the wireless communication system 100 of FIG. 1 are included in U.S. patent application Ser. No. 11/007,700, filed Dec. 8, 2004, which is incorporated herein by reference. Although the wireless communication system 100 of FIG. 1 provide a suitable operating environment for the use of unified messaging interfaces and associated methods of the invention, the invention can also be practiced in a variety of other wireless communication systems that support the creation and transmission of different types of electronic messages.

II. Unified Messaging Interface

Figure 3:
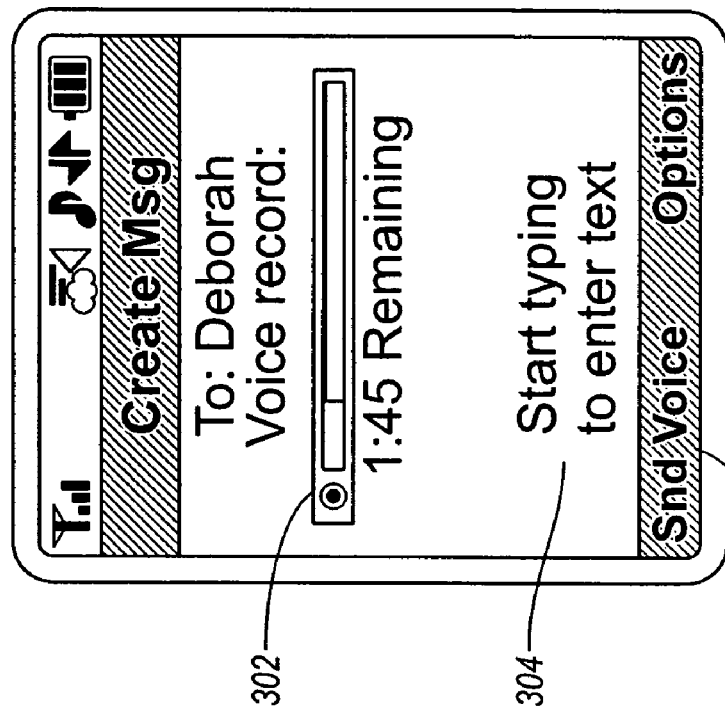
FIG. 2-4 are sample screens illustrating how the user interface of the unified messaging interface can appear.
Figure 2:
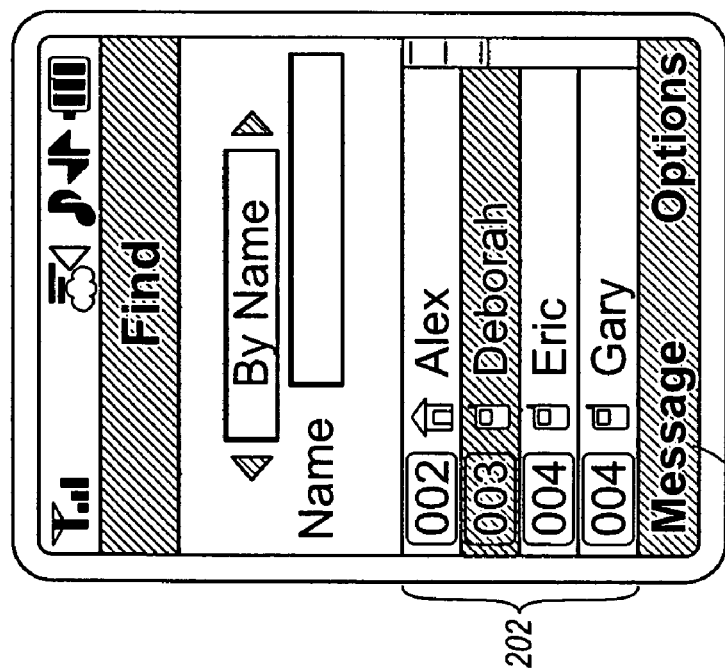
Figure 4:
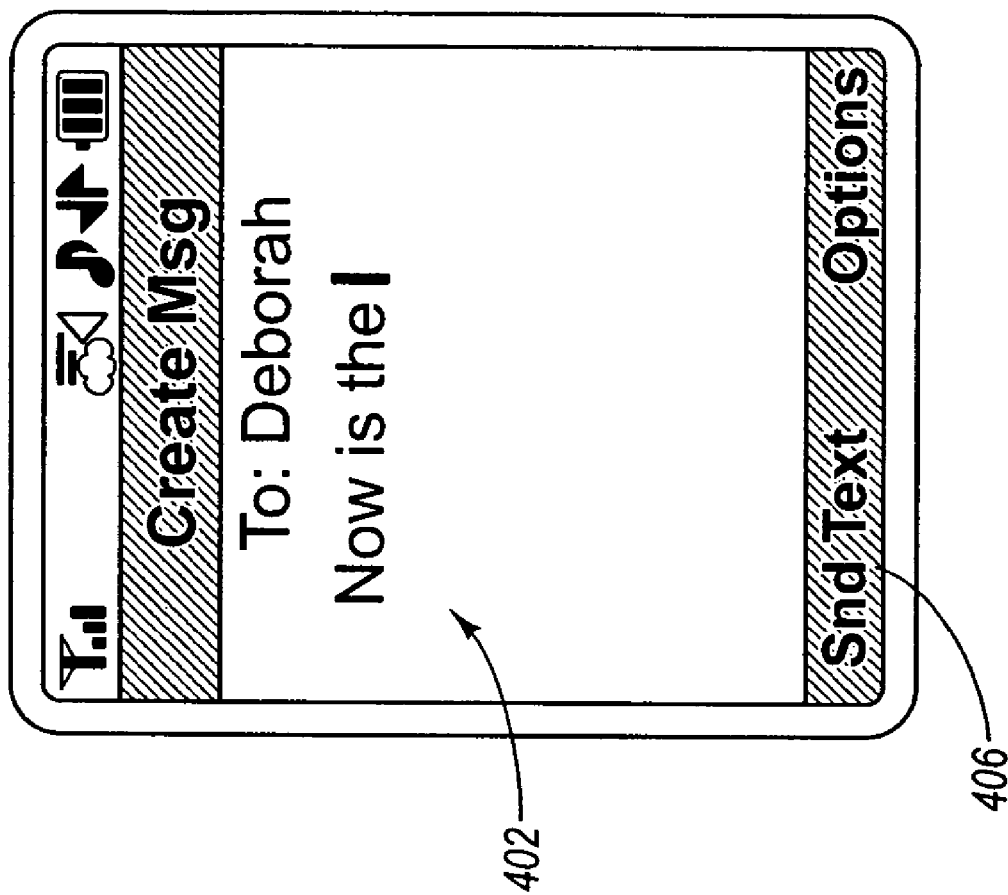

Now described in reference to FIGS. 2 through 4 is an example of the methods of the invention by which a message is authored using the Unified Messaging Interface. In FIG. 2, a sender selects the "Message" soft key 201 from the contact list 202 of a Sender Device. According to the invention, the service request to author a message can be created at the Sender Device 102 using any of a variety of possible "one-click"-enabled user interfaces and procedures. In this example, the interface of the wireless service installed on the device employs a method whereby the sender issues a spoken "single voice-command," in lieu of a single click of a soft key, a button, or a key on a keypad, to execute the request. The term "one-click", as used herein, extends to any user input operation or event that requires only a single action from the user, and is not limited to clicking a button. The single voice command and pressing a single button or key once on a keypad, and pressing a soft key once, are non-limiting examples of a "one-click" action.

In FIG. 3, in response to the Unified Messaging Interface invocation, Sender Device 102 transitions to a mode in which it assists the sender in the process of composing the message. Immediately the device begins recording audio with the assumption that the user wants to send a voice message as shown by element 302 of the interface. At any time, the user can start typing, also known as "triple-tapping," to author a text rather than voice message as prompted by element 304 of the interface. In this case, the voice recording is discarded and the screen 402 in FIG. 4 is displayed, allowing the user to enter the text message. At any time in FIG. 3 or FIG. 4, the user can press then "Send Voice" soft key 306 or "Send Text" soft key 406, and the message will be delivered to the recipient previously selected. The Sending Device then submits the request to the wireless service, which can be carried out using conventional methods.

In the foregoing manner, voice or text messages can be quickly authored with a unified authoring interface with "one-click" access on a sender device. Alternately, the Unified Messaging Interface can provide a single interface for composing and sending a picture message in addition to voice and text messages. In particular, the option of creating and sending a picture message can be provided by the Unified Messaging Interface with a key that initiates that mode. In general, the principles of the invention, which include detecting the action of the user as the process of creating a message is initiated, can be extended to substantially any combination of two or more different types of messages, including those that exist now (e.g., text, voice, picture) and those that will be developed in the future.

III. Examples of Use of Unified Messaging Interface

While embodiments of the invention are described in detail herein, the invention can be further illustrated by presenting specific examples of the efficiency gained using the methods of the Unified Authoring Environment. It is noted that the following example is presented only to illustrate the invention, and the specific implementation described hereinafter does not limit the scope of the invention.

According to a first example, the user selects the recipient from her mobile phone contact list, and clicks on a soft key to invoke the Unified Authoring Interface. She begins to speak her message and when done, presses the "send" key. Alternatively the user could hold the message key while speaking, and upon letting go the message is sent. This removes another user action from the system, further simplifying the interface. Using this technique, the user has authored an audio message with one (if the button is held while speaking) or two clicks (one to begin, and one to end/send).

Similarly, if the user were to desire to send a text message, she would start to "triple-tap" on the keyboard to create the message rather than to start speaking into the device. When she is done, she would press the send key.

Figure 5:
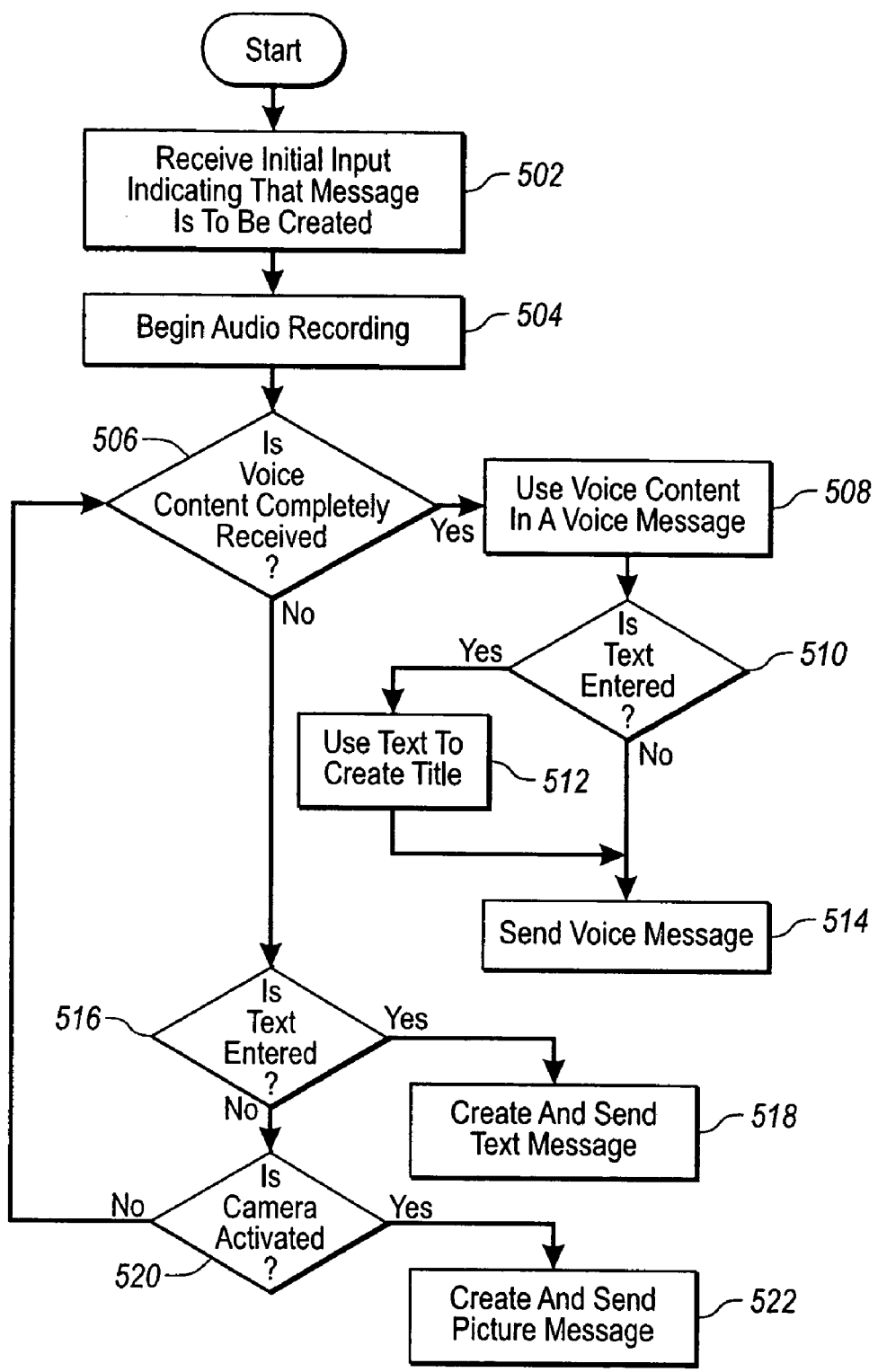
FIG. 5 is a flow chart illustrating a method according to one embodiment of the invention by which a unified authoring interface permits a sender to create a voice message, a text message, or a picture message.

According to a second example illustrated in FIG. 5, the user provides input that indicates that the process of creating and sending a message is to begin (step 502). According to this example, the wireless communication device, in response to the user input, begins making an audio recording (step 504) of any voice content that is received after the user input. If the voice content is completely received (decision 506) the received voice content is used in a voice message (step 508). If text the user enters text to the wireless communication device after the voice content is completely received and before the voice message is transmitted (decision 510), the entered text is used to create a title for the voice message (512). In either case, the wireless communication device then initiates transmission of the voice message (step 514).

If the user instead begins entering text to the wireless communication device before voice content is received or before a full amount of voice content is completely received (decision 516), the unified authoring interface of the invention recognizes the fact that text has been entered and initiates creation of and sends a text message that incorporates the entered text (step 518).

Optionally, this example can also extend to the use of a wireless device that has camera capabilities. In this case, the user can activate the camera shutter prior to completion of a voice message. If the wireless communication device detects activation of the camera shutter prior to the creation of a complete voice message (decision 520), the unified authoring interface of the invention initiates creation of a picture message using the picture that has been obtained by the wireless communication device. The wireless communication device then transmits the picture message to the recipient (step 522).

As these examples show, the decision of whether to send a voice message, a text message, or another type of message (e.g., a picture message) is made implicitly by the system based on the user actions. In this way, the system is simplified from traditional mobile phone message authoring solutions.

IV. Telecommunication Devices and Computing Environments

Embodiments of the present invention may be implemented in connection with a special purpose or general purpose telecommunications device, including wireless telephones and other telephony-enabled mobile devices, personal digital assistants, laptop computers, or other mobile special purpose or general purpose computers that are adapted to have telecommunications or data networking capabilities. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

We claim:

1. In a wireless communication system in which messages can be created and transmitted to recipients, a method for initiating transmission of a message using a unified messaging interface, comprising:
   at a wireless communication device that is associated with a sender and is capable of creating messages of more than one type, including at least a first message type and a second message type:
      receiving user input indicating that the user will create a message that is to be sent to a recipient; and
      receiving, from the user, content to be included in the message, wherein the content is adapted for use in only one of the first message type and the second message type;
   detecting the content and identifying the message type for which the content is adapted to be used; and
   in response to identifying the message type, creating the message, wherein the message has the identified message type.

2. The method of claim 1, wherein the user input does not specify the message type of the message that is to be created.

3. The method of claim 1, wherein the user input indicating that the user will create a message that is to be sent to a recipient is generated in response to a one-click action of the user.

4. The method of claim 1, wherein:
   the first message type is associated with voice messages; and
   the second message type is associated with text messages.

5. The method of claim 1, wherein:
   the first message type is associated with voice messages; and the second message type is associated with picture messages.

6. The method of claim 1, wherein:
the first message type is associated with text messages; and
the second message type is associated with picture messages.

7. The method of claim 1, wherein:
the wireless communication device is capable of creating messages of at least three types, including at least the first message type, the second message type, and a third message type; and
and the content received from the user is adapted for use in only one of the first message type, the second message type, and the third message type.

8. The method of claim 7, wherein:
the first message type is associated with voice messages;
the second message type is associated with text messages; and
the third message type is associated with picture messages.

9. The method of claim 1, wherein:
receiving content to be included in the message includes receiving voice input from the user; and
creating the message includes creating a voice message that has the voice input as content.

10. The method of claim 1, wherein:
receiving content to be included in the message includes receiving text input from the user; and
creating the message includes creating a text message that has the text input as content.

11. The method of claim 1, wherein:
receiving content to be included in the message includes receiving picture input from the user; and
creating the message includes creating a picture message that has the picture input as content.

12. The method of claim 1, further comprising, after creating the message, initiating transmission of the message to a recipient.

13. The method of claim 12, wherein initiating transmission of the message to the recipient is performed without requiring additional input from the user after the message is created.

14. The method of claim 1, wherein the user input indicating that the user will create a message that is to be sent to a recipient comprises selection by the user of a recipient from a contacts list.

15. The method of claim 1, wherein:
the user input indicating that the user will create a message that is to be sent to a recipient is generated in response to the user depressing a key of the wireless communication device; and
the method further comprises, after creating the message, initiating transmission of the message to a recipient in response to the user again depressing the key of the wireless communication device.

16. The method of claim 1, wherein:
the user input indicating that the user will create a message that is to be sent to a recipient is generated in response to the user depressing a key of the wireless communication device;
the user continues to depress the key of the wireless communication device as the wireless device receives the content to be included in the message; and
the method further comprises, after creating the message, initiating transmission of the message to a recipient in response to the user releasing the key of the wireless communication device.

17. The method of claim 1, wherein the user input indicating that the user will create a message that is to be sent to a recipient comprises a voice command.

18. In a wireless communication device that operates in a wireless communication system in which messages can be created and transmitted to recipients, a method for initiating transmission of a message using a unified messaging interface, comprising:
in response to user input indicating that the user will create a message that is to be sent to a recipient, initiating recording that can be used with a voice message;
if the user provides voice content and the voice content is completely received, initiating transmission of the voice message after the voice content is completely received; and
if the user enters text to the wireless communication device before the voice content is completely received:
creating a text message rather than a voice message, wherein the text message includes content associated with the entered text; and
initiating transmission of the text message.

19. The method of claim 18, wherein, if the user activates a camera shutter of the wireless communication device before the voice content is completely received:
creating a picture message rather than a voice message, wherein the picture message includes content associated with a picture taken by the wireless communication device; and
initiating transmission of the picture message.

20. The method of claim 18, wherein, if the user enters text to the wireless communication device after the voice content is completely received and before transmission of the voice message is initiated, creating a title of the message that includes the entered text.

* * * * *

UNITED STATES PATENT AND TRADEMARK OFFICE
CERTIFICATE OF CORRECTION

PATENT NO.         : 7,363,029 B2
APPLICATION NO.    : 11/129126
DATED              : April 22, 2008
INVENTOR(S)        : Konstantin Othmer Page 1 of 1

It is certified that error appears in the above-identified patent and that said Letters Patent is hereby corrected as shown below:

Title Page
Related US Application Data - change Patent # "7,183,687" to -- 7,133,687 --

Column 1
Line 10/11, change Patent # "7,183,687" to -- 7,133,687 --

Column 3
Line 62, change "provide" to -- provides --

Column 5
Line 17, change "if text the user" to -- if the user --

Column 7
Line 13, change "and the content" to -- the content --

Signed and Sealed this

Ninth Day of December, 2008

JON W. DUDAS
*Director of the United States Patent and Trademark Office*